United States Patent Office 3,432,475
Patented Mar. 11, 1969

3,432,475
RADIATION RESISTANT POLYURETHANES
William J. McKillip, Minneapolis, and Peter E. Throckmorton, Prior Lake, Minn., assignors to Ashland Oil & Refining Company, Ashland, Ky., a corporation of Kentucky
No Drawing. Filed Oct. 19, 1966, Ser. No. 587,695
U.S. Cl. 260—77.5
Int. Cl. C08f 22/22
13 Claims

ABSTRACT OF THE DISCLOSURE

Radiation resistant polyurethanes wherein the polyol component therefor comprises either a diol or pentol derivative of a saturated four-member heterocyclic nucleus in which the sole heterocyclic atom is either sulfur or selenium.

---

This invention relates to novel polyurethanes and to methods for their preparation. In a specific embodiment this invention relates to polyurethanes exhibiting improved resistance to radiation.

Polyurethanes have achieved significant commercial success in a wide range of applications ranging from foams which can be rigid or elastomeric to molding compositions, to coatings, to laminating resins, and to fibers. In many instances, the polyurethanes are useful in applications in which the materials are exposed to high energy radiation, such as in and around atomic reactors. The stability of the polyurethanes to such high energy radiation is frequently too low to make the polyurethane acceptable for such use despite its superior properties in other respects.

It is therefore an object of the present invention to provide novel polyurethanes.

It is a further object of the present invention to provide novel polyurethanes having improved radiation resistance.

Another object of the present invention is to provide isocyanate-terminated prepolymers containing linking units capable of imparting improved radiation resistance without deleteriously affecting valuable properties of polyurethanes derived from such isocyanate-terminated prepolymers.

Yet another object of the present invention is to provide a method for preparing polyurethanes having improved radiation resistance.

Other objects will become apparent from the following description and claims.

The novel polyurethanes of the present invention comprise reaction products of polyisocyanates and a polyol component of a heterocyclic polyol having the formulas:

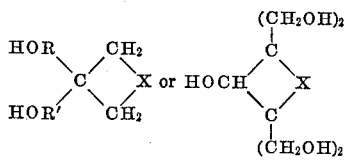

wherin X is sulfur or selenium and R and R' are alkylene radicals of 1 to 20 and preferably from 1 to 8 carbon atoms, the remainder of the polyol component being a polyether polyol, a hydrocarbon polyol, polyester polyol or mixtures thereof.

In a preferred embodiment, the polyol component is a mixture of the described heterocyclic polyol and non-heterocyclic polyols which contain from 16 to 40% by weight of the heterocyclic polyol.

Although the selenetane polyols useful in the forming of the novel polyurethanes are equivalent to the thietane polyols, the invention is specifically disclosed in terms of the thietane, it being understood that the selenetanes can be prepared and employed in the formation of the novel polyurethanes under the conditions disclosed for the thietanes.

The novel polyurethanes of the present invention can be prepared by any of the various methods heretofore established for the preparation of polyurethanes. Thus, the polyisocyanate can be admixed with the thietane polyol or mixtures of thietane polyols and thietane-free polyols in substantially stoichiometric quantities with or without the addition of a blowing agent to result directly in the formation of a polyurethane. In a preferred embodiment of the present invention, however, a polyol, and preferably a thietane-containing polyol, is reacted with a stoichiometric excess of the polyisocyanate to form an isocyanate-terminated prepolymer. This prepolymer is then reacted with additional polyol which can include thietane-containing polyols or other active hydrogen-containing crosslinking agent in a curing reaction to form the cured polyurethane. Since the reactants involved can be reacted in any order, further alternatives will be readily apparent to those skilled in the art.

In preparing the polyurethane polymers of the present invention, any of a wide variety of polyisocyanates can be employed either alone or as isomer mixtures or as mixtures of differnt polyisocyanates. Aromatic, aliphatic and cycloaliphatic diisocyanates and combinations of these types are useful. Arylene diisocyanates, i.e., those in which each of the two isocyanato groups is attached directly to an aromatic ring, are preferred. The term "polyisocyanate" as employed herein is defined as an organic compound containing at least two reactive isocyanato groups. Compounds falling within this definition are well-known in the art.

Representative polyisocyanate compounds include:

Toluene-2,4-diisocyanate;
1,4-tetramethylenediisocyanate;
1,6-hexamethylenediisocyanate;
1,10-decamethylenediisocyanate;
1,5-naphthalenediisocyanate;
Cumene-2,4-diisocyanate;
4-methoxy-1,3-phenylenediisocyanate;
4-chloro-1,3-phenylenediisocyanate;
4-bromo-1,3-phenylenediisocyanate;
4-ethoxy-1,3-phenylenediisocyanate;
2,4'-diisocyanatodiphenylether;
5,6-dimethyl-1,3-phenylenediisocyanate;
2,4-dimethyl-1,3-phenylenediisocyanate;
4,4'-diisocyanatediphenylether;
Benzidinediisocyanate;
4,6-dimethyl-1,3-phenylenediisocyanate;
9,10-anthracenediisocyanate;
4,4'-diisocyanatodibenzyl;
3,3'-dimethyl-4,4'-diisocyanatodiphenylmethane;
2,6-dimethyl-4,4'-diisocyanatodiphenyl;
2,4-diisocyanatostilbene;
3,3'-dimethyl-4,4'-diisocyanatodiphenyl;
3,3'-dimethoxy-4,4'-diisocyanatodiphenyl;
1,4-anthracenediisocyanate;
2,5-fluoroenediisocyanate;
1,8-naphthalenediisocyanate;
1,3-phenylenediisocyanate;
Methylene-bis(4-phenylisocyanate);
2,6-diisocyanatobenzylfuran;
2,4,6-toluenetriisocyanate; and
2,4,4'-triisocyanatodiphenylether.

Other representative organic isocyanates include: polyisocyanates (described in U.S. 2,683,730); organic diisocyanates (described in U.S. 2,292,443); organic triisocyanates (described in U.S. 2,929,794). Mixtures of any of the foregoing organic polyisocyanates can be employed when desired.

The thietane-free polyol component employed in combination with the polyisocyanate and the thietane-containing polyol component either in forming the isocyanate-terminated prepolymer or in curing such prepolymer or in directly forming a cured polyurethane from the reaction components can be any polyhydroxyl group-containing compound. The term as employed herein is therefore inclusive of hydrocarbon polyols, polyether polyols, polyester polyols, and mixtures of such polyols. The preferred thietane-free polyols employed in the present invention are polyether polyols. The term "hydrocarbon polyol" is meant to define a polyol which exclusive of its hydroxyl groups is a hydrocarbon but which also can contain non-polymeric oxyalkylene chains. The term "polyether polyol" is meant to define polyethers and polythioethers which contain at least one polymeric ether chain. The term "polyester polyol" is meant to define hydroxyl group-containing polyesters having more than one ester linkage.

The polyether polyols employed in forming the thietane containing polyurethanes of the present invention generally have number average molecular weights of about 300 to 10,000. Useful polyether polyols include polyalkyleneether glycols, polyalkylenearyleneether glycols, polyalkyleneether-thioether glycols, polyakylene-aryleneether-thioether glycols and polyalkyleneether triols. Polyalkyleneether glycols are preferred. Mixtures of the polyols can be used when desired.

The polyalkyleneether glycols can be represented by the formula $HO(RO)_nH$ wherein R is an alkylene radical which need not necessarily be the same in each instance and $n$ is an integer. Representative glycols include polyethyleneether glycol, polypropyleneether glycol, polytrimethyleneether glycol, polytetramethyleneether glycol, polypentamethyleneether glycol, polydecamethyleneether glycol, polytetramethyleneformal glycol and poly-1,2-dimethylethyleneether glycol. Mixtures of two or more polyalkyleneether glycols can be employed if desired. The use of polyalkyleneether glycols in the formation of polyurethane polymers is described in U.S. Patent 2,929,800.

Representative polyalkyleneether triols are made by reacting one or more alkylene oxides with one or more low molecular weight aliphatic triols. The alkylene oxides most commonly used have molecular weights between about 44 and 250. Examples include: ethylene oxide; propylene oxide; 1,2-epoxybutane; 1,2-epoxyhexane; 1,2-epoxyhexadecane; 2,3-epoxybutane; 3,4-epoxyhexane, 1,2-epoxy-5-hexene; and 1,2-epoxy-3-butene. Ethylene and propylene oxide are preferred. In addition to mixtures of these oxides, minor proportions of alkylene oxides having cyclic substituents can be present such as styrene oxide, cyclohexene oxide, 1,2-epoxy-2-cyclohexylpropane, and 2-methyl styrene oxide. The aliphatic triols most commonly used have molecular weights between about 92 and 250. Examples include glycerol, 1,2,6-hexanetriol; 1,1,1-trimethylolpropane; 1,1,1-trimethylolethane; 2,4-dimethyl-2-methylolpentanediol-1,5; and the trimethylether of sorbitol. Representative examples of the polyalkyleneether triols include: polypropyleneether triol (M.W. 700) made by reacting 608 parts of 1,2-propylene oxide with 92 parts of glycerine; polypropyleneether triol (M.W. 1535) made by reacting 1401 parts of 1,2-propylene oxide with 134 parts of trimethylolpropane; polypropyleneether triol (M.W. 2500) made by reacting 2366 parts of 1,2-propylene oxide with 134 parts of 1,2,6-hexane-triol; and polypropyleneether triol (M.W. 6000) made by reacting 5866 parts of 1,2-propylene oxide with 134 parts of 1,2,6-hexanetriol. Further examples of these polyalkyleneether triols are given in U.S. Patent 2,866,774.

The polyalkylene-aryleneether glycols are similar to the polyalkyleneether glycols except that some arylene radicals are present. Representative arylene radicals include phenylene, naphthalene and anthracene radicals which may be substituted with various substituents such as alkyl groups. In general, in these glycols there should be at least one alkyleneether radical having a molecular weight of about 500 for each arylene radical which is present. Polyurethane polymers prepared from these polyalkylene-aryleneether glycols are described in U.S. Patent 2,843,568.

The polyalkyleneether-thioether glycols and the polyalkylene-aryleneether glycols are similar to the above-described polyether glycols except that some of the ether-oxygen atoms are replaced by sulfur atoms. These glycols may be conveniently prepared by condensing together various glycols, such as thiodiglycol in the presence of a catalyst, such as p-toluene-sulfonic acid. The use of these glycols in the formation of polyurethane polymers is described in U.S. Patent 2,900,368.

The hydrocarbon polyols which are preferably aliphatic polyols suitably employed alone but preferably employed in combination with polyether polyols in the formation of the novel polyurethanes of the present invention in general have average molecular weights ranging from 62 to 350. Representative glycols include:

Ethylene glycol;
Propylene glycol;
Trimethylene glycol;
1,2-butylene glycol;
1,3-butanediol;
1,4-butanediol;
1,5-pentanediol;
1,2-hexylene glycol;
1,10-decanediol;
1,2-cyclohexanediol;
2-butene-1,4-diol;
3-cyclohexene-1,1-dimethanol;
4-methyl-3-cyclohexene-1,1-dimethanol and
3-methylene-1,5-pentanediol.

Further examples of aliphatic polyols include alkylene oxide modified diols such as Diethylene glycol;
(2-hydroxyethoxy)-1-propanol;
4-(2-hydroxyethoxy)-1-butanol;
5-(2-hydroxyethoxy)-1-pentanol;
3-(2-hydroxypropoxy)-1-propanol;
4-(2-hydroxypropoxy)-1-butanol;
5-(2-hydroxypropoxy)-1-pentanol;
1-(2-hydroxyethoxy)-2-butanol;
1-(2-hydroxyethoxy)-2-pentanol;
1-(2-hydroxymethoxy)-2-hexanol;
1-(2-hydroxyethoxy)-2-octanol;
1-(2-hydroxypropoxy)-2-butanol;
1-(2-hydroxypropoxy)-2-propanol;
1-(2-hydroxypropoxy)-2-hexanol and
1-(2-hydroxypropoxy)-2-octanol.

Representative examples of ethylenically unsaturated low molecular weight diols include:

3-allyloxy-1,5-pentanediol;
3-allyloxy-1,2-propanediol;
2-allyloxymethyl-2-methyl-1,3-propanediol;
2-methyl-2-[(4-pentenyloxy)methyl] - 1,3 - propanediol; and
3-(o-propenylphenoxy)-1,2-propanediol;

Others are listed in U.S. 2,927,098; 2,854,486.

Representative examples of low molecular weight polyols having at least 3 hydroxyl groups include:

Glycerol;
1,2,6-hexanetriol;
1,1,1-trimethylolpropane;
1,1,1-trimethylolethane;
Pentaerythritol;
3-(2-hydroxyethoxy)-1,2-propanediol;
3-(2-hydroxypropoxy)-1,2-propanediol;

6-(2-hydroxyethoxy)1,2-hexanediol;
2,4-dimethyl - 2 - (2-hydroxyethoxy)methylpentanediol-1,5; mannitol; galactitol; talitol; iditol; allitol; altritol; gulitol; arabitol; ribitol; xylitol; lyxitol; erythritol; threitol; 1,2,5,6-tetrahydroxy hexane; meso-inositol; sucrose; glucose; galactose; mannose; fructose, xylose; arabinose; dihydroxyacetaone; 1,1,1-tris-[(2-hydroxyethoxy)methyl]ethane and 1,1,1-tris-[(2-hydroxypropoxy)methyl]propane.

Other examples are included in U.S. 2,917,468.

The polyester polyols suitable in forming the polyurethanes of the present invention include such polyesters as are obtained by the polymerization of cyclic lactones but are preferably obtained by the condensation polymerization of dicarboxylic acids with a molar excess of diols. Optionally a small amount of higher functional polyol such as described above can be included. Suitable diols include ethylene glycol; propylene glycol; trimethylene glycol; 1,2-butylene glycol; 1,3-butanediol, 1,4-butanediol; 1,5-pentanediol; 1,2-hexylene glycol; 1,10-decanediol; 1,2-cyclohexanediol; 2-butene-1,4-diol; 3-cyclohexane-1,1-dimethanol; and 2-methyl-1,3-propane diol. If desired, mixtures of two or more of these diols can be employed. Representative examples of useful dicarboxylic acid are oxalic acid, malonic acid, succinic acid, glutaric acid, adipic acid, pimelic acid, suberic acid, azelaic acid, sebacic acid, fumaric acid, maleic acid, phthalic acid, and terephthalic acid. Anhydrides of dicarboxylic acids can be employed in place of the acids such as succinic anhydride and phthalic anhydride. If desired, mixtures of two or more of these dicarboxylic acids and/or anhydrides can be employed.

The thietane components of the novel polyurethanes of the present invention are thietane containing diols and thietane containing pentols. The thietane containing diols are prepared by a number of methods. Thus, the thietane diols can be prepared by the transesterification of a tetrol containing at least two methylol groups attached to a single carbon atom of the tetrol such as pentaerythritol with a dialkyl carbonate such as diethyl carbonate or by reaction with phosgene followed by the reaction of the resulting cyclic or polymeric product with an alkali metal thiocyanate at elevated temperatures, causing the evolution of carbon dioxide. After no further $CO_2$ is evolved, the reaction temperature is increased and the thietane is obtained from the reaction mixture by sublimation, distillation, or other suitable technique. Suitable thietane diols employed in the formation of the novel polyurethanes include 3,3-bis(hydroxymethyl)thietane; 3,3-bis-($\beta$-hydroxyethyl)thietane; 3 - hydroxymethyl - 3-($\beta$-hydroxyethyl)-thietane; 3,3-bis(6' - hydroxyhexyl)thietane and 3-hydroxymethyl-3-(4'-hydroxybutyl)-thietane.

The thietane pentol employed in the formation of the novel polyurethane of the present invention is obtained by the reaction of five moles of formaldehyde with one mole of 3-thietanone in water at temperatures of about 10° C. in the presence of a basic catalyst such as calcium oxide. The reaction mixture is neutralized by the addition of formic acid. The reaction product is extracted with hot methanol and the pentol is obtained on stripping the methanol.

Both the described thietane diols and the pentol can be further modified by reaction with alkylene oxides such as ethylene oxide or propylene oxide to provide oxyalkylene-containing thietane diols and thietane pentols.

Although it is feasible to employ as the polyol component solely the thietane it is greatly preferred to form the polyurethanes from combinations of the described thietane-free polyols and the thietanes. It is not essential that mixtures of such polyols and thietanes are employed particularly where sequential polymerization, i.e., the formation of a prepolymer followed by curing of the prepolymer is involved. Thus, in such sequential polymerization the initial polyol component employed can be a mixture of the thietane-free polyol and the thietane polyol or can be solely a thietane or solely a thietane-free polyol, the polyol component not employed in the formation of the prepolymer being employed in the curing step. It is to be pointed out, however, that optimum results are obtained if a prepolymer is formed from mixtures of the thietane and the thietane-free polyol component.

In preparing the novel polyurethane polymers directly from the components the proportions of reactants should be selected such that the value of the molar ratio of —NCO groups to the total number of —OH groups ranges between about 0.95:1 and 1.1:1. In the formation of isocyanate terminated prepolymers the polyisocyanate is employed in a molar excess of about 40 to 200% and preferably in a molar excess of about 50 to 100%. It will be recognized that as the isocyanate excess is increased the resulting prepolymer will have a lower molecular weight.

When preparing the polyurethanes of the present invention it is desirable to maintain the reagents as a homogeneous mixture from the time when they are mixed together until the time when they have completely reacted to form the cured polyurethane. Reaction temperatures involved in the direct formation of the polyurethanes are generally in the range of 100 to 160° C. Isocyanate terminated prepolymers are generally formed at temperatures of 25 to 120° C. and cured at temperatures of 80 to 150° C. It is to be understood however that both higher temperatures requiring shorter reaction times and lower temperatures requiring longer reaction times can be employed.

The formation of the polyurethane can be conducted in the presence or absence of solvents. If solvents are employed they should be inert, i.e., free of reactive hydrogen. Representative examples of suitable solvents are lower dialkyl ketones (such as methyl isobutyl ketone), lower alkyl esters (such as ethyl acetate), aromatic hydrocarbons (such as toluene and tylene), aliphatic hydrocarbons (such as hexane), chlorinated hydrocarbons (such as trichloro- and tetrachloroethylene), and cyclic ethers (such as tetrahydrofuron). The isocyanate terminated prepolymers or the cured polyurethanes can be isolated from the solvent by conventional means such as spray drying, drum drying, or evaporation. Those skilled in the art can readily select solid contents to suit their particular operation or the particular application intended for the cured polyurethane.

If desired, catalysts which accelerate the curing of the polyurethane can be employed. Such catalysts include triethyl amine, metal carboxylates, e.g., lead naphthenate diethylcyclohexylamine, or ferric acetylacetonate. Similarly, other additives heretofore employed in the formation of polyurethanes such as, for example, blowing agents, can also be employed in the polyurethanes of the present invention.

The cured polyurethanes of the present invention containing the thietane ring structure exhibit improved physical properties such as ultimate strength and elastic modulus. In addition, the polyurethanes of the present invention exhibit a greater thermal stability and a higher degree of resistance to degradation from radiation. The extent to which the foregoing properties are improved will depend to a certain degree on the concentration of the thietane ring in the polyurethane. Optimum contents of thietane ring in the polyurethane will, however, differ with the particular application of the polyurethane.

The cured polyurethanes of the present invention can be employed in all applications heretofore developed for polyurethanes such as in laminating and coating resins, in the formation of rigid and elastomeric foams, elastomeric fibers, and in the formation of molded articles.

The invention is further illustrated by the following examples in which all parts and percentages are by weight unless otherwise noted.

Example 1

Into a reaction flask placed in an oil bath is charged under a blanket of dry nitrogen 245 g. (1.4 mols) of toluene diisocyanate commercially available as "Hylene TM," 100 ml. of a 70:30 mixture of ethyl acetate and benzene as solvent, and five drops of benzoyl chloride. A mixture of polyols is prepared employing 15.9 g. of 3,3-bis(hydroxymethyl)thietane, 60.7 g. of polypropylene glycol having a molecular weight of 425 and a hydroxyl number of 256.7, and 37.6 g. of trimethylol propane. The mixture was dissolved in 165 ml. of the described solvent. The molar ratio of —NCO to —OH of all reagents is 2:1. The polyol component is added dropwise to the isocyanate component at room temperature with agitation. On completion of the addition of the polyol component, requiring about 90 minutes, the temperature of the reaction mixture rises to about 60° C. The reaction mixture is then heated with continued agitation for a period of about one hour at 70 to 80° C. and then allowed to stand for about 12 hours. The resulting isocyanate prepolymer solution has a total solids content of 60%, a reacted thietane diol content of 4.4% by weight, based on 100% solids, and a solution —NCO content of 10% (the thietane diol is reacted through the hydroxyl groups in every example; the thietane moiety is retained unchanged).

Example 2

Following substantially the procedure of Example 1, 32.2 g. of meta-phenylene diisocyanate is reacted with 4.44 g. of trimethylolpropane and 6.8 g. 3,3-bis(hydroxymethyl)thietane. The total amount of the solvent (70% ethyl acetate —30% benzene) employed in 29.0 g. and 1 drop of benzoyl chloride is added to the isocyanate. The addition of the polyol and agitation beyond the addition are carried out at temperatures of 25 to 30° C. maintained by cooling the reaction mixture. The resulting isocyanate prepolymer solution has a solids content of 60%, a —NCO content of 12% and a reacted thietane diol content of 15.7% (based on 100% solids), 50% of the reacted hydroxyl groups being attached to the thietane moiety.

Example 3

Following substantially the procedure of Example 1, 43.7 g. of toluene diisocyanate is reacted with 6.63 g. of trimethylol propane and 6.8 g. of 3,3-bis(hydroxymethyl)thietane. The total amount of the solvent employed (70% ethyl acetate, 30% benzene) is 38.0 g. and 1 drop of benzoyl chloride is added to the isocyanate. The addition of the polyol is at a temperature of 30 to 40° C. Agitation is maintained for an additional hour after addition of the polyol component while heating the reaction mixture to a temperature of 70 to 80° C. The resulting isocyanate prepolymer solution has a solids content of 60%, a —NCO content of 12%, and a reacted thietane diol content of 11.9% (based on 100% solids), 40% of the reacted hydroxyl groups being attached to the thietane moiety.

Example 4

Into a reaction flask placed in an ice bath is charged under a blanket of nitrogen 119 g. of meta-phenylene diisocyanate in 40 g. of a 70:30 mixture of ethyl acetate and benzene. Two drops of benzoyl chloride are added. A mixture of polyols is prepared employing 9.98 g. of 3,3-bis(hydroxymethyl)thietane, 19.76 g. of trimethylolpropane and 32.4 g. of polypropylene glycol having a molecular weight of 425 and a hydroxyl number of 256.7 dissolved in 81 g. of the described mixed solvent. The molar ratio of —NCO to —OH of all reagents is 2:1. The polyol component is added dropwise to the isocyanate component with agitation while maintaining the temperature below 30° C. On complete addition of the polyol, agitation is continued at room temperature for an additional 12 hours. The resulting isocyanate prepolymer solution had a solids content of 60%, a reacted thietane diol content of 5.5% (based on 100% solids), and a solution —NCO content of 10%. 20% of the reacted hydroxyl groups are attached to the thietane moiety.

The prepolymer solution is employed to prepare three-ply laminates employing #181 glass fabric coated with A-1100 finish employing an amino-functional, commercially available treatment, by impregnating each ply separately, flashing off solvent from the impregnated ply, combining the three plys in a press for a period of five minutes at 95° C. under sufficient pressure to coalesce the plys; removal from press and curing at 25° C. in water vapor atmosphere for 48 hours. The resulting laminate has a glass fiber content of about 70%.

Similar laminates are prepared from isocyanate prepolymers, containing only trimethylol propane and polypropylene glycol in the polyol component. The laminates and their properties are compared in the following table.

TABLE

| | Thietane-free glass laminate | Thietane-containing glass laminate |
|---|---|---|
| m-Phenylene diisocyanate content (based on resin) mol percent | 71.1 | 71.4 |
| 3,3-bis(hydroxymethyl)thietane content (based on resin) (mol percent) | | 7.1 |
| Trimethylol propane content (based on resin) (mol. percent) | 14.2 | 14.2 |
| Polypropylene glycol content (based on resin) (mol percent) | 14.7 | 7.3 |
| Ultimate (flexural) strength (ASTM-D-790) (p.s.i.) | 3.67×10⁴ | 4.56×10⁴ |
| Flexural elastic modulus (p.s.i.) | 2.02×10⁵ | 2.11×10⁵ |
| Thermal stability (integral procedural decomposition temperature), (Method of C. D. Doyles, Anal. Chem. 33 77 (1961) (° C.) | 281 | 368 |
| Radiation resistance: 2,800 hour exposure 10⁵ rads/hr. gamma ray radiation [Measured as change in flexural modulus of elasticity relative to unirradiated controls]. (Cs¹³⁷ source) (percent) | −13.1 | −0.8 |

The foregoing examples have illustrated the preparation of isocyanate-terminated prepolymers and polyurethane including the thietane moiety. Properties of the cured thietane containing polyurethanes have similarly been demonstrated. It will be apparent that other polyisocyanates and other polyol components included within the scope of the invention and not specifically illustrated in the examples can be employed in the specific procedures illustrated. The variations and modifications of the particular procedures employed in the preparation of the polyurethanes illustrated in the examples will be apparent to those skilled in the polyurethane art. Such alternate procedures can be similarly employed in the preparation of the novel polyurethanes of the present invention, as will also be apparent from the foregoing discussion. It is, therefore, to be understood that the present invention is not limited to the particular embodiments illustrated, but that many and widely different embodiments obvious to those skilled in the art can be made without departing from the scope of the invention.

What is claimed is:

1. A novel polyurethane comprising the reaction product of a polyisocyanate and a polyol component, said polyol component containing from 10 to 100% of a heterocyclic polyol having the formulas:

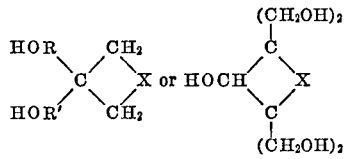

wherein X is sulfur or selenium and R and R' are alkylene radicals of 1 to 20 carbon atoms the remainder of the polyol component being a polyether polyol, hydrocarbon polyol, polyester polyols or mixtures thereof, said polyisocyanate and the polyol components being reacted in relative amounts to provide an overall ratio of isocyanate to hydroxyl groups of from about 0.95:1 to 1.1:1, respectively.

2. The polyurethane of claim 1 wherein X is sulfur.

3. The polyurethane of claim 2 wherein said heterocyclic polyol has the formula:

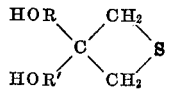

4. The polyurethane of claim 3 wherein the thietane diol is 3,3-bis(hydroxymethyl)thietane.

5. A novel isocyanate-terminated polyurethane prepolymer obtained by reacting a polyisocyanate with a polyol component containing from 10 to 100% of a thietane polyol having the formula:

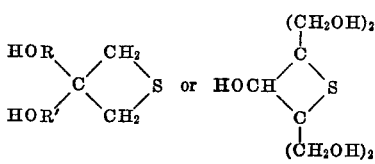

wherein R and R' are alkylene radicals of 1 to 8 carbon atoms the remainder of the polyol component being a polyether polyol, a hydrocarbon polyol, a polyester polyol or mixtures thereof, the polyisocyanate being employed in a stoichiometric excess of 20 to 200% based on the polyol.

6. The isocyanate-terminated polyurethane prepolymer of claim 5 wherein the thietane has the formula:

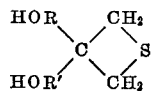

7. The isocyanate-terminated polyurethane prepolymer of claim 5 wherein the thietane is 3,3-bis(hydroxymethyl)thietane.

8. The isocyanate-terminated prepolymer of claim 7 wherein the polyol component is a mixture of a polyether polyol and the thietane polyol.

9. The isocyanate-terminated prepolymer of claim 7 wherein the polyol component is a mixture of a hydrocarbon polyether and the thietane polyol.

10. The isocyanate terminated prepolymer of claim 7 where the polyol component is a mixture of a polyether polyol, a hydrocarbon polyol and the thietane polyol.

11. The isocyanate-terminated prepolymer of claim 5 wherein the polyisocyanate is m-phenylene diisocyanate.

12. The isocyanate-terminated prepolymer of claim 5 wherein the polyisocyanate is toluene diisocyanate.

13. The substantially insoluble and infusible product obtained in crosslinking the isocyanate-terminated prepolymer of claim 7 by exposure to a moist atmosphere.

References Cited
UNITED STATES PATENTS 3,251,857  5/1966  Hostettler et al. _____ 260—327
2,929,800  3/1960  Hill _____ 260—77.5

DONALD E. CZAJA, Primary Examiner.

M. J. WELSH, Assistant Examiner.

U.S. Cl. X.R.

117—161; 161—190; 204—159.19; 260—75, 327, 239, 2.5